(12) United States Patent
Soma et al.

(10) Patent No.: US 12,156,005 B2
(45) Date of Patent: Nov. 26, 2024

(54) SOUND PROCESSING METHOD, SOUND DEVICE, AND SOUND PROCESSING SYSTEM

(71) Applicant: YAMAHA CORPORATION, Hamamatsu (JP)

(72) Inventors: Keiichiro Soma, Hamamatsu (JP); Arata Imai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 432 days.

(21) Appl. No.: 17/590,209

(22) Filed: Feb. 1, 2022

(65) Prior Publication Data

US 2022/0256290 A1 Aug. 11, 2022

(30) Foreign Application Priority Data

Feb. 8, 2021 (JP) ................. 2021-017891

(51) Int. Cl.
| | |
|---|---|
| H04R 5/04 | (2006.01) |
| G06F 13/40 | (2006.01) |
| G06F 13/42 | (2006.01) |
| H04R 3/00 | (2006.01) |

(52) U.S. Cl.
CPC .......... *H04R 5/04* (2013.01); *G06F 13/4018* (2013.01); *G06F 13/4226* (2013.01); *H04R 3/00* (2013.01)

(58) Field of Classification Search
CPC . H04R 5/04; H04R 3/00; H04R 25/43; H04R 2420/01; G06F 13/4018; G06F 13/4226; G06F 3/165; H04H 60/04
USPC ...................................... 381/119, 123; 369/4
See application file for complete search history.

(56) References Cited

U.S. PATENT DOCUMENTS

| | | | | | |
|---|---|---|---|---|---|
| 5,604,663 | A | * | 2/1997 | Shin ...................... | G06F 1/1632 361/679.43 |
| 6,148,243 | A | * | 11/2000 | Ishii ...................... | G06F 1/1632 381/98 |
| 6,374,148 | B1 | * | 4/2002 | Dharmarajan .......... | G06F 3/162 381/119 |
| 8,031,887 | B2 | * | 10/2011 | Kageyama ............. | H04H 60/04 381/119 |

(Continued)

FOREIGN PATENT DOCUMENTS

| | | |
|---|---|---|
| JP | 2010256386 A | 11/2010 |
| JP | 2011066740 A | 3/2011 |

OTHER PUBLICATIONS

Office Action issued in Japanese Patent Application No. 2021-017891 mailed Aug. 27, 2024. English translation provided.

*Primary Examiner* — Xu Mei
(74) *Attorney, Agent, or Firm* — ROSSI, KIMMS & McDOWELL LLP

(57) ABSTRACT

A sound processing method for a sound device including at least a physical controller, connectable to a sound processing apparatus, the method including, control the physical controller to operate in a first mode to execute an assignable function in the sound device, and a second mode to execute a preassigned function in the sound processing apparatus in a state where the sound device is connected thereto, detecting whether the sound device is connected to the sound processing apparatus, and receiving a switching instruction to switch from the first mode to the second mode after detecting connection between the sound device and the sound processing apparatus.

15 Claims, 8 Drawing Sheets

(56) References Cited

U.S. PATENT DOCUMENTS

| | | | |
|---|---|---|---|
| 8,315,413 B2* | 11/2012 | Yamkovoy | H04B 1/385 |
| | | | 381/119 |
| 8,406,907 B2* | 3/2013 | Koski | H04M 1/6058 |
| | | | 700/94 |
| 11,758,343 B2* | 9/2023 | Ohashi | H04S 1/007 |
| | | | 381/17 |
| 2008/0226099 A1* | 9/2008 | Aiso | H04H 60/04 |
| | | | 381/119 |
| 2011/0069025 A1 | 3/2011 | Fujita | |
| 2012/0027228 A1* | 2/2012 | Rijken | H04H 60/04 |
| | | | 381/119 |

* cited by examiner

FIG. 5
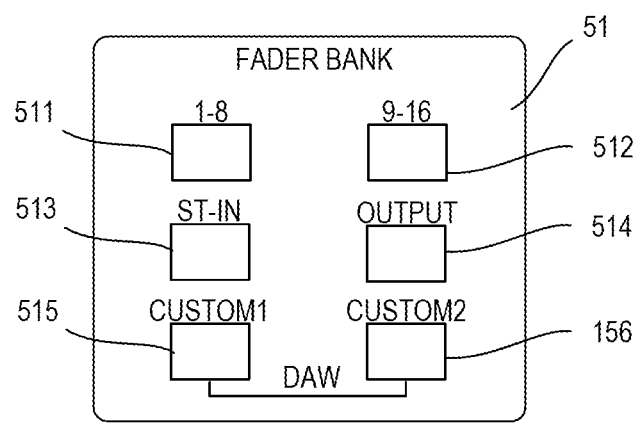
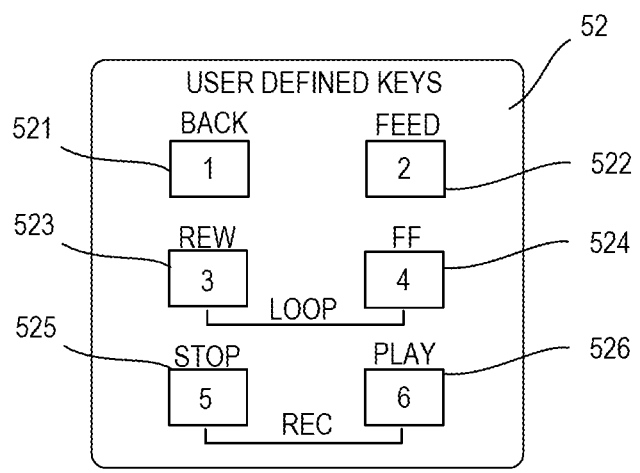

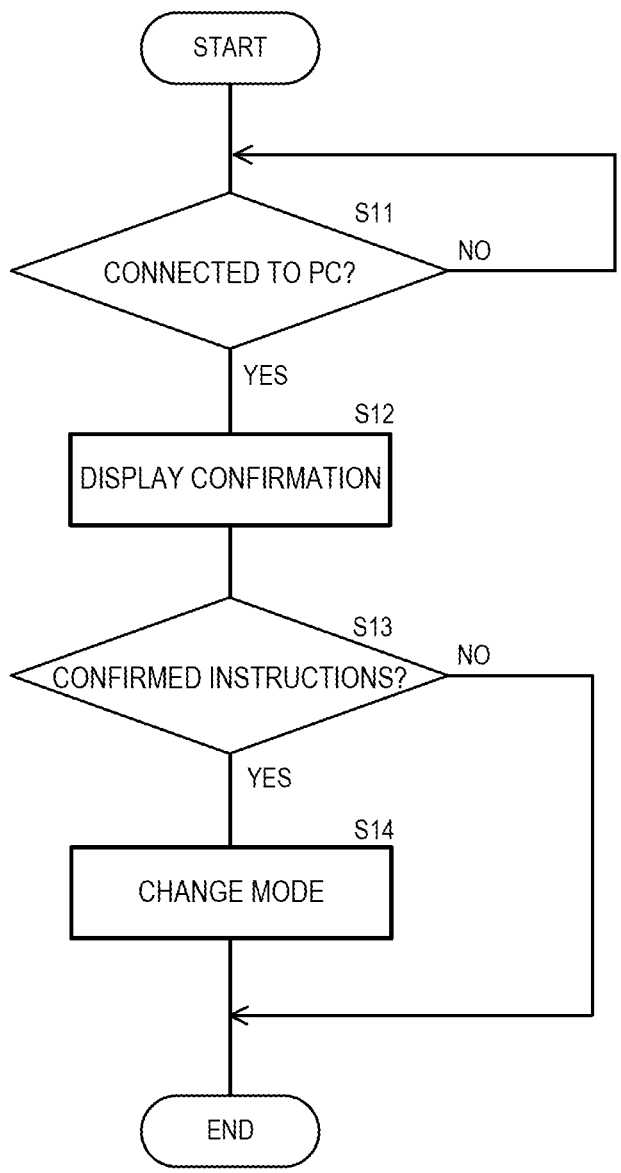

SOUND PROCESSING METHOD, SOUND DEVICE, AND SOUND PROCESSING SYSTEM

CROSS REFERENCE TO RELATED APPLICATIONS

This Nonprovisional application claims priority under 35 U.S.C. § 119(a) on Patent Application No. 2021-017891 filed in Japan on Feb. 8, 2021, the entire contents of which are hereby incorporated by reference.

BACKGROUND

Technical Field

An embodiment of the present disclosure relates to a sound processing method, a sound device, and a sound processing system.

Background Information

A mixing console disclosed in Japanese Unexamined Patent Application Publication No. 2011-066740 includes 24 user-defined keys to be assigned to any functions. Four switching keys that switch banks A, B, C, and D are arranged at a top portion of the user-defined keys.

The conventional user-defined key can only be assigned to any function of a mixing console.

SUMMARY

An object of an embodiment of the present disclosure is to provide a sound processing method capable of executing a function of not only a sound device such as a mixing console but also a sound processing apparatus to be connected to a sound device.

A sound processing method for a sound device including at least a physical controller, connectable to a sound processing apparatus, the method including, control the physical controller to operate in a first mode to execute an assignable function in the sound device, and a second mode to execute a preassigned function in the sound processing apparatus in a state where the sound device is connected thereto, detecting whether the sound device is connected to the sound processing apparatus, and receiving a switching instruction to switch from the first mode to the second mode after detecting connection between the sound device and the sound processing apparatus.

According to an embodiment of the present disclosure, a function of not only a sound device such as a mixing console but also a sound processing apparatus to be connected to a sound device is able to be executed.

BRIEF DESCRIPTION OF THE DRAWINGS

FIG. 5 is an enlarged view of a fader bank area 51 and a user-defined key area 52.

FIG. 8 is a flow chart showing an operation of the audio mixer.

DETAILED DESCRIPTION

Figure 1:
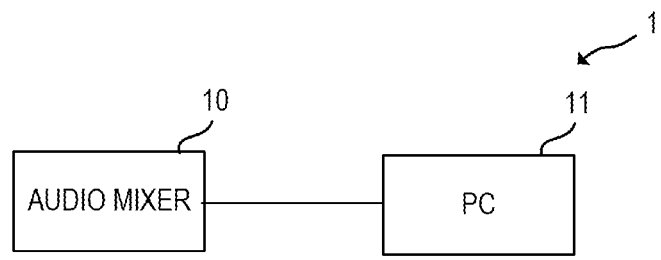
FIG. 1 is a block diagram showing a configuration of a sound processing system.
Figure 2:
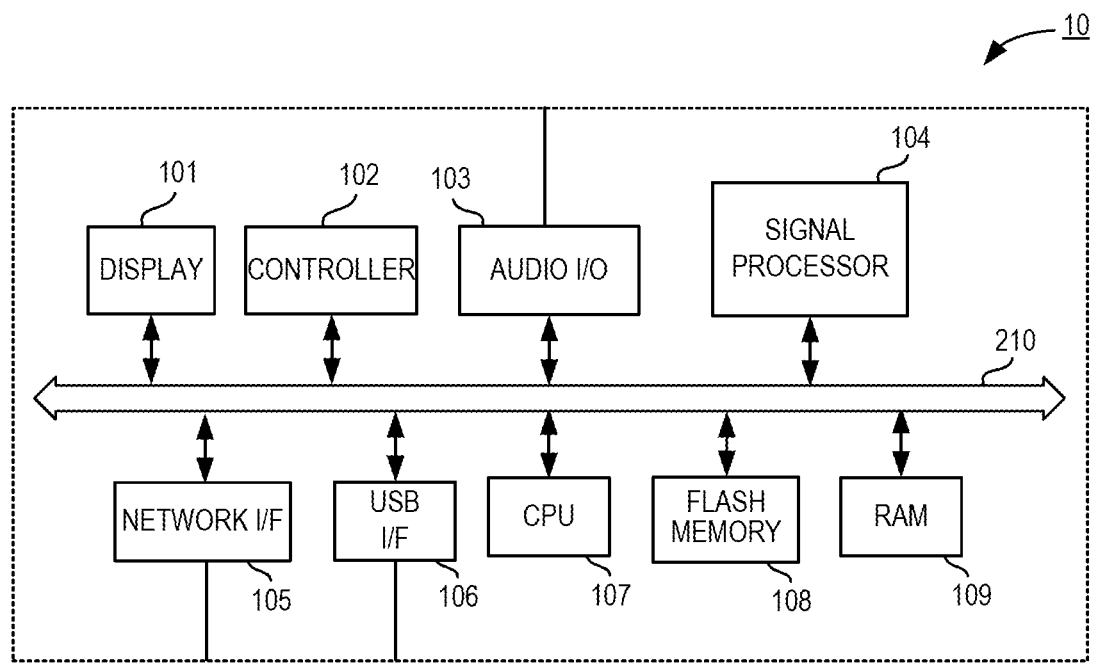
FIG. 2 is a block diagram showing a hardware configuration of an audio mixer.
Figure 3:
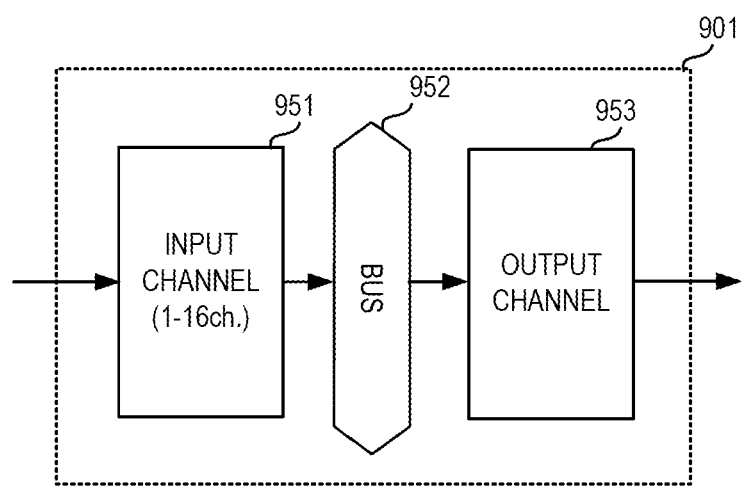
FIG. 3 is a view showing a functional configuration of a signal processing block.
Figure 4:
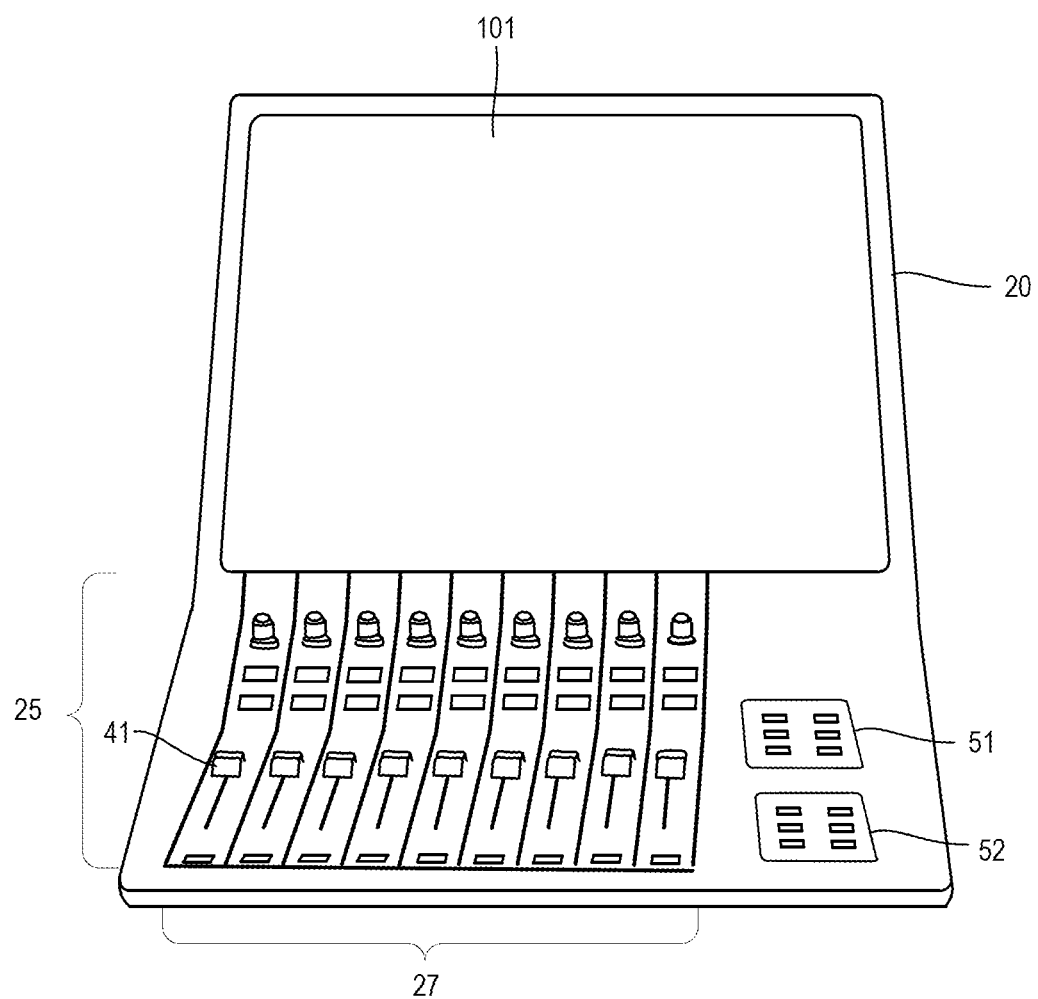
FIG. 4 is a front perspective view of the audio mixer.

FIG. 1 is a block diagram showing a configuration of a sound processing system. FIG. 2 is a block diagram showing a hardware configuration of an audio mixer. FIG. 3 is a view showing a functional configuration of a signal processing block of the audio mixer. FIG. 4 is a front perspective view of the audio mixer.

As shown in FIG. 1, an audio processing system 1 includes an audio mixer 10 and a personal computer (PC) 11 to be connected to the audio mixer 10. The audio mixer 10 and the PC 11 are connected, for example, by a USB (Universal Serial Bus) cable. The audio mixer 10 is an example of a sound device of the present disclosure. The audio mixer 10 receives an input of an audio signal from other devices connected to the own device or outputs an audio signal to the other devices.

The audio mixer 10 receives an input of an audio signal from a sound device such as a microphone or a musical instrument. The audio mixer 10 performs signal processing such as mixing processing or effect processing, on an inputted audio signal. The audio mixer 10 sends the audio signal on which the signal processing has been performed, to the PC 11.

The audio mixer 10 includes a display 101, an controller 102, an audio I/O (Input/Output) 103, a digital signal processor (DSP) 104, a network I/F (interface) 105, a USB I/F 106, a CPU 107, a flash memory 108, and a RAM 109. These components are connected to each other through a bus 210.

The CPU 107 controls an operation of the audio mixer 10. The CPU 107 reads and executes a program stored in the flash memory 108 being a storage medium to the RAM 109 and performs various types of operations. It is to be noted that the program does not need to be stored in the flash memory 108 of the own device. For example, the program may be downloaded each time from another device such as a server and may be read out to the RAM 109.

The CPU 107 performs input and output of an audio signal in the audio I/O 103, control of mixing processing in the signal processor 104, control of effect processing, a change in a value of a parameter relating to such performance, and the like.

The display 101 may include an LCD (Liquid Crystal Display), for example, and displays various types of information according to the control of the CPU 107. The controller 102 receives an operation to the audio mixer 10 from a user. The controller 102 is configured by various types of physical controllers. In addition, the controller 102 may include a touch panel laminated on the display 101.

The signal processor 104 includes a DSP (Digital Signal Processor) to perform various types of signal processing such as mixing processing or effect processing. The signal processor 104 performs signal processing such as mixing processing or effect processing on an audio signal inputted from the audio I/O 103, the network I/F 105, or the USB I/F 106. The signal processor 104 outputs the audio signal on which the signal processing has been performed, through the audio I/O 103, the network I/F 105, or the USB I/F 106.

As shown in FIG. 3, the signal processing block 901 is configured by an input channel 951, a bus 952, and an output channel 953. In this example, the input channel 951 has 16 (1-16) channels. The bus 952 has various types of buses such as a stereo bus, a MIX bus, and a MATRIX bus. The output channel 953 is a block that processes the audio signal sent out from each bus.

Each channel of the input channel 951 performs effect processing such as an equalizer (EQ) or a compressor (COMP) on an inputted audio signal. Each channel in the input channel 951 sends out the audio signal on which the signal processing has been performed, to the bus 952 provided in the subsequent stage. The level of the audio signal that the input channel sends out is adjusted by the physical controller such as a fader 41.

The bus 952 mixes audio signals sent out from each input channel, and outputs the audio signal to the output channel 953.

The output channel 953 performs effect processing such as an equalizer or a compressor on the inputted audio signal. The audio signal on which the signal processing has been performed is supplied to the audio I/O 103, the network I/F 105, or the USB I/F 106.

In the example of FIG. 1, the audio mixer 10 and the PC 11 are connected to each other through a USB cable. The audio mixer 10 sends an audio signal to the PC 11 through the USB I/F 106.

The PC 11 is an example of a sound processing apparatus according to the present disclosure. The PC 11 executes a DAW (Digital Audio Workstation) application program. A user performs work such as recording or editing of an audio signal received from the audio mixer 10 through the DAW of the PC 11. In such a case, the PC 11 functions as an editing device.

As shown in FIG. 2, the audio mixer 10 includes a housing 20. The display 101 is disposed at a front upper portion of the housing 20. An operation panel 25 is disposed at a front lower portion of the housing 20. In the operation panel 25, a channel strip section 27, a fader bank area 51, and a user-defined key area 52 are disposed.

The channel strip section 27 includes eight input channel sections and one master section. A plurality of physical controllers including the fader 41 are disposed at each channel section. A user operates the fader 41 and adjusts the level of each input channel and an output channel.

FIG. 5 is an enlarged view of the fader bank area 51 and the user-defined key area 52. The fader bank area 51 has a 1-8 bank switch 511, a 9-16 bank switch 512, an ST-IN switch 513, an OUTPUT switch 514, a CUSTOM switch 155, and a CUSTOM switch 156. The user-defined key area 52 has six switches (a switch 521, a switch 522, a switch 523, a switch 524, a switch 525, and a switch 526).

When the 1-8 bank switch 511 is selected, the eight input channel sections in the channel strip section 27 serve as sections of the input channels 1 to 8. When the 9-16 bank switch 512 is selected, the eight input channel sections in the channel strip section 27 serve as sections of the input channels 9 to 16.

When the ST-IN switch 513 is selected, the eight input channel sections in the channel strip section 27 serve as various input section levels including a stereo channel. When the OUTPUT switch 514 is selected, the eight input channel sections in the channel strip section 27 serve as sections to adjust an amount of feed to the various types of buses such as the stereo bus, the MIX bus, and the MATRIX bus.

When selecting either of the CUSTOM switch 155 and the CUSTOM switch 156, the user can assign an arbitrary channel to the fader 41. The eight input channel sections in the channel strip section 27 serve as a section of the arbitrary channel assigned by the user. In addition, when the CUS-TOM switch 155 and the CUSTOM switch 156 are selected simultaneously, the eight input channel sections in the channel strip section 27 serve as sections to adjust a parameter to each track being edited by the DAW of the PC 11.

Figure 6:
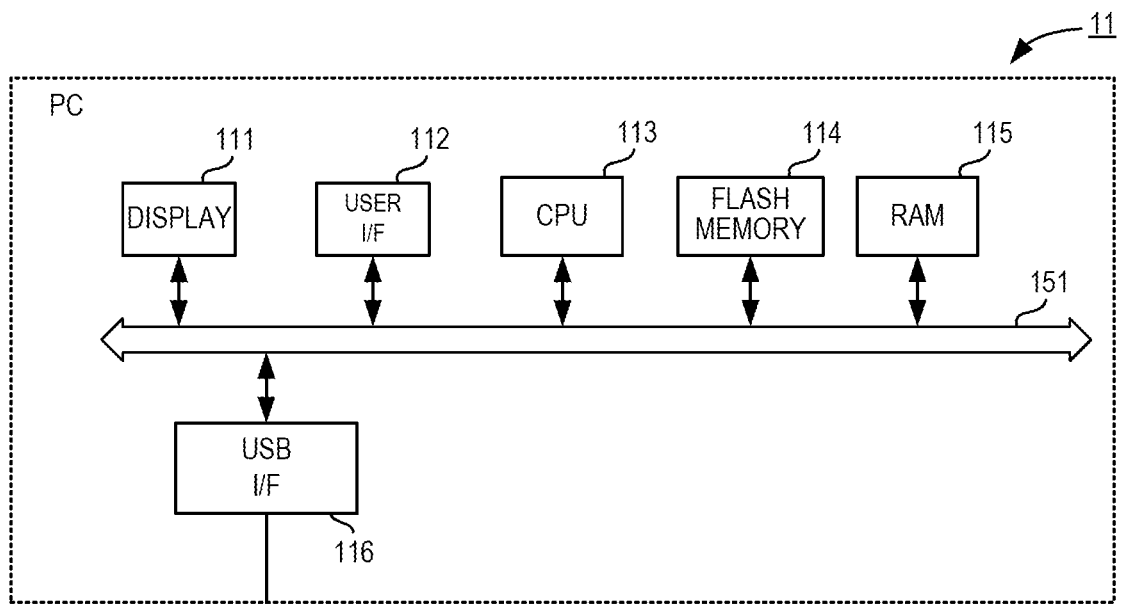
FIG. 6 is a block diagram showing a configuration of a PC 11.
Figure 7:
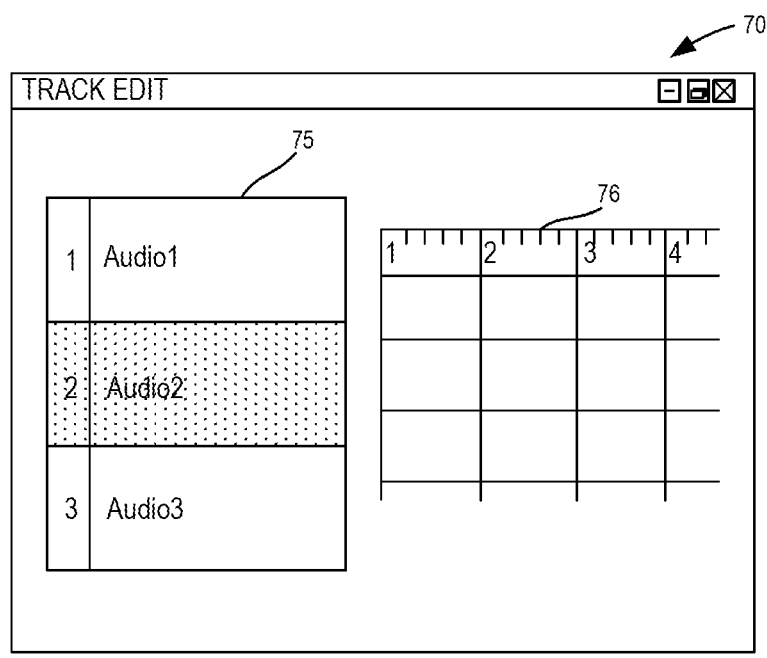
FIG. 7 is an example of a GUI in a DAW.

FIG. 6 is a block diagram showing a configuration of the PC 11, and FIG. 7 shows an example of a GUI (Graphical User Interface) in the DAW. The PC 11 includes a display 111, a user I/F 112, a CPU 113, a flash memory 114, a RAM 115, and a USB I/F 116. These components are connected to each other through a bus 151.

The display 111 includes an LCD, for example, and displays various types of information according to the control of the CPU 113. The user I/F 112 includes a mouse or a keyboard, and receives an operation of a user. The user I/F 112, together with the display 111, configures the GUI.

The CPU 113 reads a program stored in the flash memory 114 being a storage medium to the RAM 115 and implements a predetermined function. For example, the CPU 113 reads a DAW application program from the flash memory 114, and achieves such a GUI as shown in FIG. 7.

The GUI shown in FIG. 7 is an example of a track edit screen 70 to create multitrack content in the DAW. The CPU 113 displays a track list 75 and a timeline 76 in the track edit screen 70.

The track list 75 displays one or a plurality of tracks. A user selects any one of the tracks in the track list 75. When the user selects a track, a time-axis waveform of a selected track and the like are displayed on the timeline 76. As described above, the user can record or edit the selected track.

When the user selects the CUSTOM switch 155 and the CUSTOM switch 156 of the audio mixer 10 simultaneously, a mode of the various types of physical controllers of the audio mixer 10 is switched from a first mode to execute an assignable function in the audio mixer 10 to a second mode to execute a preassigned function with respect to the DAW.

In the second mode, the CPU 107 of the audio mixer 10, for example, causes the eight input channel sections in the channel strip section 27 to function as sections to adjust a parameter to each track of the track list 75.

In such a case, the CPU 107 sends a volume adjustment value according to an operation position of the fader 41 of each input channel section, to the PC 11. The PC 11 adjusts a volume of a corresponding track according to a received volume adjustment value.

In addition, in the second mode, the CPU 107 displays a notification such as "DAW REMOTE," for example, on the display 101, and notifies a user of a state in which the audio mixer 10 is switched to the second mode to control the DAW.

In the first mode, the six switches (the switch 521, the switch 522, the switch 523, the switch 524, the switch 525, and switch 526) of the user-defined key area 52 function to execute the assignable function that is arbitrarily assigned to the audio mixer 10. In the second mode, the six switches (the switch 521, the switch 522, the switch 523, the switch 524, the switch 525, and switch 526) of the user-defined key area 52 function to execute the preassigned function (a fixed function) with respect to the DAW.

In the example of FIG. 5, when a user selects the switch 521, the CPU 107 executes a function to return a track selected in the DAW by one. For example, when the user operates the switch 521 while the track 2 is selected in the DAW, a track to be selected changes to track 1. Since an indication of "BACK" is attached to at an upper portion of the switch 521, the user can determine at a glance that the function fixed to the switch 521 is a function to move a track backward by one.

When the user selects the switch 522, the CPU 107 executes a function to advance the track selected in the DAW by one. For example, when the user operates the switch 522 while the track 2 is selected in the DAW, a track to be selected changes to track 3. Since an indication of "FEED" is attached to an upper portion of the switch 522, the user can determine at a glance that the function fixed to the switch 522 is a function to move a track forward by one.

When the user selects the switch 523, the CPU 107 executes a function to turn back (fast rewind) time of the timeline 76. Since an indication of "REW" is attached to an upper portion of the switch 523, the user can determine at a glance that the function fixed to the switch 523 is a fast rewind function.

When the user selects the switch 524, the CPU 107 executes a function to advance (fast forward) time of the timeline 76. Since an indication of "FF" is attached to at an upper portion of the switch 524, the user can determine at a glance that the function fixed to the switch 524 is a fast forward function.

When the user selects the switch 525, the CPU 107 executes a function to stop reproduction. Since an indication of "STOP" is attached to at an upper portion of the switch 525, the user can determine at a glance that the function fixed to the switch 525 is a reproduction stop function.

When the user selects the switch 526, the CPU 107 executes a function to start (resume) reproduction. Since an indication of "PLAY" is attached to at an upper portion of the switch 526, the user can determine at a glance that the function fixed to the switch 526 is a reproduction start function.

When the user operates the switch 523 and the switch 524 simultaneously, the CPU 107 executes a function to turn on or off a loop of the DAW. Since "LOOP" is indicated on a line that connects the switch 523 and the switch 524, the user can determine at a glance that the loop of the DAW can be turned on or off when the switch 523 and the switch 524 are operated simultaneously.

When the user operates the switch 525 and the switch 526 simultaneously, the CPU 107 executes a function to start recording. Since "REC" is indicated on a line that connects the switch 525 and the switch 526, the user can determine at a glance that recording can be started when the switch 525 and the switch 526 are operated simultaneously.

In this manner, in the second mode, the audio mixer 10 may execute a different function in a case in which any one of the plurality of physical controllers is operated, and in a case in which two or more of the plurality of physical controllers are operated simultaneously.

In the above example, in a case in which the user selects the CUSTOM switch 515 and the CUSTOM switch 156 of the audio mixer 10 simultaneously, the first mode is switched to the second mode. However, the audio mixer 10, in a case of detecting connection with the PC 11, may automatically execute switching from the first mode to the second mode. In addition, the audio mixer 10, in a case of detecting disconnection from the PC 11, may execute switching processing from the second mode to the first mode.

Furthermore, the audio mixer 10 receives confirmed instructions of the switching processing from the user, and, after receiving the confirmed instructions, may execute the switching processing from the first mode to the second mode. FIG. 8 is a flow chart showing an operation of the audio mixer 10. The audio mixer 10 determines whether or not the connection with the PC 11 is detected (S11). The audio mixer 10, in the case of detecting the connection with the PC 11 (S11→YES), performs a confirmation display such as "MOVE TO DAW REMOTE?" on the display 101 (S12). In addition, the audio mixer 10 displays a selection of "YES" and "NO" on the display 101, and determines whether the confirmed instructions have been received from the user (S13). When the user selects "YES," the audio mixer 10 receives the confirmed instructions of the switching processing from the user (S13→YES), and executes the switching processing from the first mode to the second mode (S14).

In this manner, the audio mixer 10, in the case of detecting the connection with the PC 11, receives the confirmed instructions of the switching processing from the user, and, after receiving the confirmed instructions, may execute the switching processing from the first mode to the second mode. Accordingly, the user can control the DAW only by giving the confirmed instructions in the audio mixer 10, that is, by simply operating the audio mixer 10 without operating the PC 11. The user can perform operations such as mixing and editing, only by operating the audio mixer 10, without operating a plurality of apparatuses.

In the second mode, since a single apparatus is able to control both of the audio mixer 10 and the DAW, it is preferable to execute the switching processing after the confirmed instructions are received and the user is clearly aware of the instructions. On the other hand, the DAW is not controlled while the connection with the PC 11 is released, so that the audio mixer 10, in the case of detecting disconnection from the PC 11, may execute the switching processing from the second mode to the first mode without receiving the confirmed instructions.

The present embodiment is illustrative in all points and should not be construed to limit the present disclosure. The scope of the present disclosure is defined not by the foregoing embodiments but by the following claims for patent. Further, the scope of the present disclosure is intended to include all modifications within the scopes of the claims and within the meanings and scopes of equivalents.

While the above embodiment shows the example in which the user-defined key area 52 has the six switches (the switch 521, the switch 522, the switch 523, the switch 524, the switch 525, and switch 526), the number of user-defined keys may be one. In addition, while the example in which the function assigned to the user-defined key in the second mode is fixed is shown, the present disclosure is not limited to such an example.

In addition, in the above embodiment, the sound processing apparatus (the PC 11) connected to the audio mixer 10 being a sound device is an editing device, the PC 11 edits an audio signal sent from the sound device to the sound processing apparatus, and the audio mixer 10 executes the function in connection with editing in the PC 11 in the second mode. However, the sound processing apparatus is not limited to the editing device. For example, the sound processing apparatus may perform plug-in effect processing, and the sound device may execute the function of the plug-in effect processing.

What is claimed is:

1. A sound processing method for a sound device including at least a first physical controller, connectable to a sound processing apparatus operable as a digital audio workstation (DAW), the method comprising:
controlling the first physical controller of the sound device to operate in:

a first mode to execute an assigned function of the sound device; and a second mode to execute a preassigned function of the DAW in a state where the sound device is connected thereto;

detecting whether the sound device is connected to the sound processing apparatus; and receiving a switching instruction to switch from the first mode to the second mode after detecting connection between the sound device and the sound processing apparatus, wherein the first physical controller comprises a user operable switch, wherein in the first mode, the assigned function is arbitrarily assignable, and wherein in the second mode, the preassigned function is a fixed function among functions of the DAW.

2. The sound processing method according to claim 1, further comprising receiving another switching instruction to switch from the second mode to the first mode after detecting no connection between the sound device and the sound processing apparatus.

3. The sound processing method according to claim 1, wherein the receiving receives the switching instruction, which is a confirmed instruction from a user.

4. The sound processing method according to claim 1, wherein:

the sound device includes a plurality of physical controllers, including the first physical controller, and wherein each of the plurality of physical controllers provides a different function among the functions of the DAW.

5. The sound processing method according to claim 4, wherein the second mode executes another function in a state where any of the plurality of physical controllers other than the first physical controller is operated or more than one of the plurality of physical controllers are operated simultaneously.

6. The sound processing method according to claim 1, wherein:

the DAW edits an audio signal sent from the sound device to the sound processing apparatus, and the sound device executes a function in connection with the editing in the second mode.

7. The sound processing method according to claim 6, wherein the sound device is an audio mixer.

8. A sound device comprising:

a first physical controller comprising a user operable switch; and a processor configured to:
control the first physical controller to operate in:
a first mode to execute an assigned function of the sound device; and
a second mode to execute a preassigned function of a digital audio workstation (DAW) provided by a sound processing apparatus in a state where the sound device is connected thereto;
detect whether the sound device is connected to the sound processing apparatus; and
receive a switching instruction to switch from the first mode to the second mode after detecting connection between the sound device and the sound processing apparatus, wherein in the first mode, the assigned function is arbitrarily assignable, and wherein in the second mode, the preassigned function is a fixed function among functions of the DAW.

9. The sound device according to claim 8, wherein the processor is further configured to receive another switching instruction to switch from the second mode to the first mode after detecting no connection between the sound device and the sound processing apparatus.

10. The sound device according to claim 8, wherein the switching instruction is a confirmed instruction from a user.

11. The sound device according to claim 8, further including:

a plurality of physical controllers, including the first physical controller, wherein each of the plurality of physical controllers provides a different function among the functions of the DAW.

12. The sound device according to claim 11, wherein the second mode executes another function in a state where any of the plurality of physical controllers other than the first physical controller is operated or more than one of the plurality of physical controllers are operated simultaneously.

13. The sound device according to claim 8, wherein:

the DAW edits an audio signal sent from the sound device to the sound processing apparatus, and the sound device executes a function in connection with the editing in the second mode.

14. The sound device according to claim 8, wherein the sound device is an audio mixer.

15. A sound processing system comprising:

a sound processing apparatus operable as a digital audio workstation (DAW);

a sound device connectable to the sound processing apparatus, and including:
a physical controller comprising a user operable switch; and
a processor configured to:
control the physical controller to operate in:
a first mode to execute an assigned function of the sound device; and
a second mode to execute a preassigned function of the DAW in a state where the sound device is connected thereto;
detect whether the sound device is connected to the sound processing apparatus; and
receive a switching instruction to switch from the first mode to the second mode after detecting connection between the sound device and the sound processing apparatus, wherein in the first mode, the assigned function is arbitrarily assignable, and wherein in the second mode, the preassigned function is a fixed function among functions of the DAW.

* * * * *